Sept. 19, 1967  H. T. OPENSHAW ET AL  3,342,825
METHOD FOR MAKING BENZO(a) QUINOLIZINE DERIVATIVES
Filed Nov. 22, 1960
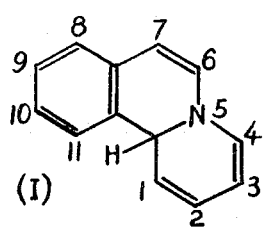
(I)
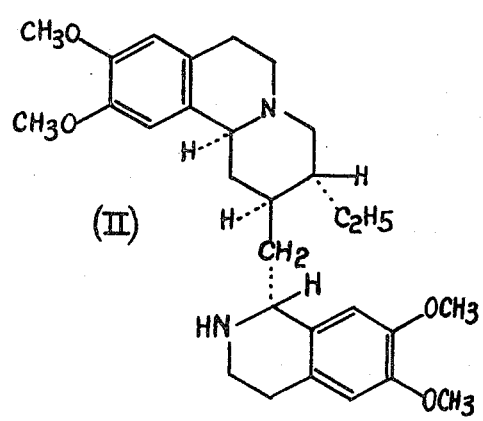
(II)
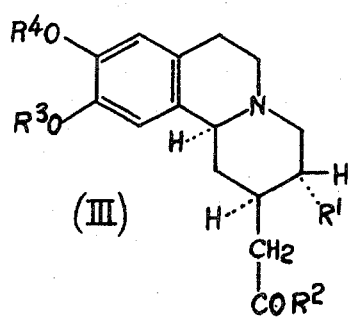
(III)
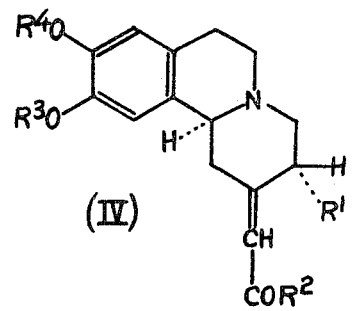
(IV)
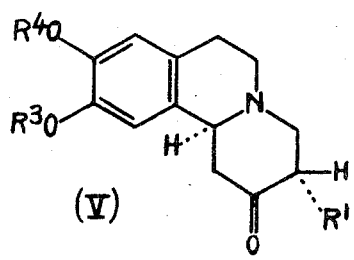
(V)
INVENTOR
Harry Tacon Openshaw
and Norman Whittaker
BY James M. Mason
ATTORNEY

3,342,825
METHOD FOR MAKING BENZO(a)QUINOLIZINE DERIVATIVES
Harry Tacon Openshaw and Norman Whittaker, London, England, assignors to Burroughs Wellcome & Co. (U.S.A.) Inc., Tuckahoe, N.Y., a corporation of New York
Filed Nov. 22, 1960, Ser. No. 71,045
Claims priority, application Great Britain, Nov. 24, 1959, 39,935/59
3 Claims. (Cl. 260—287)

This invention relates to the preparation of 11b-benzo(a)quinolizine derivatives, the numbering of this ring system is shown in Formula I of the drawings. One of these derivatives, the natural product (—)-emetine shown in Formula II of the drawings, is an established drug in the treatment of amoebiasis. A major difficulty in the synthesis of emetine and its analogues has been the preparation of intermediates having the desired stereochemical configuration.

This invention provides a new method for the preparation of compounds of Formula III of the drawings, in which the asymmetric centres have the same relative stereochemical configuration as in emetine, and which are useful intermediates for the synthesis of emetine and its analogues. (For a generally applicable method, see A. R. Battersby and J. C Turner, Journal of the Chemical Society, 1960, 717–725). According to the invention, a compound of Formula III is prepared by the catalytic hydrogenation, preferably under acid conditions, of a correspondingly substituted compound of Formula IV of the drawings.

In the drawings, Formulae III, IV and V are to be read as comprising also the mirror images of the structures depicted, and in the formulae $R^1$ is an alkyl group having from 1 to 4 carbon atoms, $R^2$ is a hydroxy or lower alkoxy group and $R^3$ and $R^4$ are methyl or ethyl groups or together form a methylene group. The precise nature of the group $R^2$ is relatively unimportant, because this group is eliminated at a later stage in the synthesis of emetine and its analogues and does not appear in the ultimate product.

The invention provides in particular a method for the preparation of a compound of Formula III, wherein $R^1$ is an ethyl group and $R^3$ and $R^4$ are methyl groups, by the catalytic hydrogenation of a correspondingly substituted compound of Formula IV. The invention in another aspect provides a compound of Formula III, and particularly one wherein $R^1$ is an ethyl group and $R^3$ and $R^4$ are methyl groups, when prepared by the method described above or its obvious chemical equivalent.

The compounds of Formula IV are new compounds and are described in copending application No. 71,046 filed Nov. 22, 1960, now U.S. Patent 3,123,609. When $R^2$ is a lower alkoxy group, they may conveniently be made from a correspondingly substituted ketone of Formula V of the drawings by condensation with a (lower alkoxycarbonylmethylene)triarylphosphorane. The lower alkoxy group may then be converted by hydrolysis into a hydroxy group. In the compounds of Formulae IV and V, the two asymmetric centres at C(3) and C(11b) have the same relative configuration as in emetine. This invention is based on the fortunate circumstance that the compounds of Formula III, which can be isolated in good yield from the product of catalytic hydrogenation of the compounds of Formula IV, not only retain the desired configuration at C(3) and C(11b), but have the desired configuration also at C(2).

Accordingly, a compound consisting of the optical enantiomer actually depicted in Formula IV, obtained from a ketone consisting of the optical enantiomer actually depicted in Formula V, is catalytically hydrogenated to give a compound consisting of the optical enantiomer actually depicted in Formula III, which may then be converted to (—)-emetine or an analogue thereof without the need for optical resolution at a later stage. This application of the method and the optical enantiomer actually depicted in Formula V that is thereby prepared, are special features of the invention.

The following examples illustrate the invention. All temperatures are given in degree Celsius, and the configuration of the compounds is indicated by reference to the appropriate formula of the drawings.

*Example 1*

Racemic 3-ethyl-1,2,3,4,6,7-hexahydro-9,10-dimethoxy-2 - methoxycarbonylmethylene - 11b-benzo(a)quinolizine (IV) (3 g.), platinum oxide (0.3 g.), and methanol (60 ml.) were shaken under hydrogen at room temperature and pressure. Absorption of hydrogen (281 ml. at 20°/764 mm.) ceased after about 70 minutes. After filtering from catalyst, the methanol solution was evaporated, the residual gum was dissolved in hot light petroleum (boiling point 60–80°) and the the solution evaporated again. The residual gum was then crystallised from a little light petroleum (boiling point 60°–80°) to give 1.03 g. of colourless needles of racemic 3-ethyl-1,2,3,4,6,7-hexahydro - 9,10 - dimethoxy-2-methoxycarbonyl-methyl-11b-benzo(a)quinolizine (III) of melting point 79–81°.

*Example 2*

Racemic 3-ethyl-1,2,3,4,6,7-hexahydro-9,10-dimethoxy-2 - methoxycarbonylmethylene - 11b-benzo(a)quinolizine (IV) (15 g.) was dissolved in methanol (120 ml.) containing slightly more than one equivalent of hydrogen chloride. Platinum oxide (0.75 g.) was then added, and the mixture shaken under hydrogen Absorption of hydrogen (1225 ml. at 23°/761 mm.) was complete after 27 minutes. The solution was filtered from catalyst, evaporated in vacuo, and the residual gum was dissolved in cold water, made basic with potassium hydroxide, and extracted with ether. The ethereal extract was washed with water, dried over sodium sulphate, and evaporated. The resulting gum was freed from traces of ether by dissolving in hot light petroleum (boiling point 60–80°) and evaporating the light petroleum solution in vacuo. Finally, the gum was crystallised from a little light petroleum (boiling point 60–80°) to give 7.71 g. of racemic 3-ethyl-1,2,3,4,6,7 - hexahydro - 9,10 - dimethoxy-2-methoxycarbonylmethyl-11b-benzo(a)quinolizine (III) of melting point 79–81°.

The light petroleum liquors were evaporated and the residual gum subjected to chromatographic analysis on alumina, developing the column with benzene and then with ether. In this way a further 0.9 g. of the same saturated ester, of melting point 79–81°, was obtained.

*Example 3*

(—) - 3-ethyl-1,2,3,4,6,7-hexahydro-9,10-dimethoxy-2-methoxycarbonylmethylene - 11b - benzo(a)quinolizine (IV), $[\alpha]_D^{23.5}$ —42° (c.=1 in methanol), was reduced in the manner of Example 2, giving (+)-3-ethyl-1,2,3,4, 6,7 - hexahydro - 9,10 - dimethoxy-2-methoxycarbonylmethyl - 11b - benzo(a)quinolizine (III), M.P. 101.5–102.5°, $[\alpha]_D^{23.5} +37.5°$ (c.=1 in methanol).

*Example 4*

(+) - 3-ethyl-1,2,3,4,6,7-hexahydro-9,10-dimethoxy-2-methoxycarbonylmethylene - 11b - benzo(a)quinolizine (IV), $[\alpha]_D^{23} +42°$ (c.=1 in methanol), was reduced in the manner of Example 2, giving (—)-3-ethyl-1,2,3,4,6,7-hexahydro - 9,10 - dimethoxy-2-methoxycarbonylmethyl-11b-benzo(a)quinolizine (III), M.P. 102–103°,
$$[\alpha]_D^{22.5} -36°$$
(c.=1 in methanol). The asymmetric centres in this optical enantiomer of the ester have the same stereochemical configuration as in (—)-emetine, for when the ester is reacted with homoveratrylamine and the resulting homoveratrylamide is cyclised with phosphoryl chloride in benzene, (+)-O-methylpsychotrine, identical with the natural alkaloid, is obtained. Reduction of the (+) - O-methylpsychotrine gives the desired (—)-emetine.

We claim:

1. A method for the preparation of compounds of the formula

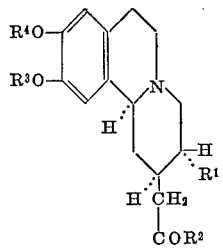

wherein $R^1$ is an alkyl group having from one to four carbon atoms, $R^2$ is selected from the class consisting of hydroxy and lower alkoxy groups and $R^3$ and $R^4$ are selected from the class consisting of the lower alkyl groups and together form a methylene group which comprises the catalytic hydrogenation of a compound of the formula

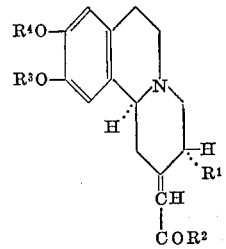

2. A method for the preparation of compounds of the formula

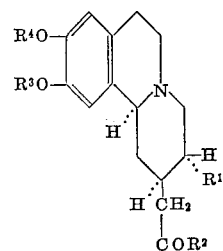

wherein $R^1$ is an alkyl group having from one to four carbon atoms, $R^2$ is selected from the class consisting of hydroxy and lower alkoxy groups and $R^3$ and $R^4$ are selected from the class consisting of the lower alkyl groups and together form a methylene group which comprises the acid catalytic hydrogenation of a compound of the formula

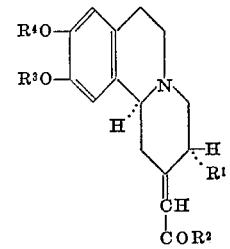

3. A method as set forth in claim 1 wherein the hydrogenation catalyst is platinum oxide.

References Cited

FOREIGN PATENTS 337,846   6/1959   Switzerland.

OTHER REFERENCES

Battersby et al.: Helvetica Chimica Acta, vol. 42, pages 1515–1518.

Battersby et al. I: J. Chem. Soc., pages 717–720 (1960).

Battersby et al. II: Chem. and Industry, pages 982–983 (1957).

Brossi et al.: Helvetica Chimica Acta, vol. 42, pages 772–786 (1959).

ALEX MAZEL, *Primary Examiner.*

IRVING MARCUS, WALTER A. MODANCE,
                                *Examiners.*

E. BERG, D. M. KERR, *Assistant Examiners.*